United States Patent
Olson et al.

(10) Patent No.: US 9,586,522 B2
(45) Date of Patent: *Mar. 7, 2017

(54) BRAKE LIGHT WITH ADAPTIVE SHUNT ARRANGEMENT

(71) Applicant: Kinetech LLC, Indianapolis, IN (US)

(72) Inventors: Mark Olson, Indianapolis, IN (US); Todd Utley, Anderson, IN (US); David Seal, Anderson, IN (US)

(73) Assignee: Kinetech LLC, Indianapolis, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/205,898

(22) Filed: Jul. 8, 2016

(65) Prior Publication Data

US 2016/0318441 A1    Nov. 3, 2016

Related U.S. Application Data

(63) Continuation of application No. 14/301,078, filed on Jun. 10, 2014.

(60) Provisional application No. 61/969,609, filed on Mar. 24, 2014, provisional application No. 61/833,011, filed on Jun. 10, 2013.

(51) Int. Cl.
*B60Q 1/44* (2006.01)
*F21S 8/10* (2006.01)

(52) U.S. Cl.
CPC ............... *B60Q 1/44* (2013.01); *F21S 48/20* (2013.01)

(58) Field of Classification Search
CPC .. B60Q 1/26; B60Q 1/44; B60Q 1/447; F21S 48/20

See application file for complete search history.

(56) References Cited

U.S. PATENT DOCUMENTS 3,164,803 A    1/1965    Leichsenring
3,305,829 A    2/1967    Knez
(Continued)

FOREIGN PATENT DOCUMENTS

DE    19638135 A1    4/1998
DE    19716597 A1    10/1998
(Continued)

*Primary Examiner* — Douglas W Owens
*Assistant Examiner* — Pedro C Fernandez
(74) *Attorney, Agent, or Firm* — Maginot Moore & Beck LLP

(57) ABSTRACT

An electronics device is configured for installation in the brake light circuitry of a vehicle braking system. The electronics device is particularly configured to provide a flashing or pulsing appearance for a brake light, such as an automobile CHMSL. The pulsing is accomplished in a precise manner and that provides additional operational safety features than standard automotive brake lights. The electronics device is configured to avoid over-triggering of the pulsating lights due to multiple application of the automobile's brakes in a short time frame. The electronics device is further configured to function correctly even if the automobile is equipped with sophisticated computer systems that analyze the brake light circuitry, and is configured to avoid detection as a problem by the vehicle's diagnostic systems. At the same time, the electronics device will still allow the vehicle's diagnostic scans to detect any actual problems with the brake light system without hindrance.

18 Claims, 6 Drawing Sheets

(56) References Cited

U.S. PATENT DOCUMENTS

| | | |
|---|---|---|
| 3,576,527 A | 4/1971 | Howard |
| 3,693,151 A | 9/1972 | Hasegawa et al. |
| 4,346,365 A | 8/1982 | Ingram |
| 4,403,210 A | 9/1983 | Sullivan |
| 4,558,226 A | 12/1985 | Takada et al. |
| 4,918,424 A | 4/1990 | Sykora |
| 4,990,887 A | 2/1991 | Lee |
| 5,172,095 A | 12/1992 | Scott |
| 5,345,218 A | 9/1994 | Woods et al. |
| 5,565,841 A | 10/1996 | Pandohie |
| 5,801,624 A | 9/1998 | Tilly et al. |
| 5,847,513 A | 12/1998 | Host |
| 5,909,174 A | 6/1999 | Dietz et al. |
| 6,317,038 B1 | 11/2001 | Leleve et al. |
| 6,411,204 B1 | 6/2002 | Bloomfield et al. |
| 6,710,709 B1 | 3/2004 | Morin et al. |
| 6,720,871 B2 | 4/2004 | Boyer et al. |
| 6,873,111 B2 | 3/2005 | Ito et al. |
| 6,943,677 B2 | 9/2005 | Boyer et al. |
| 7,456,590 B2 * | 11/2008 | Takeda ............... H05B 33/0848 307/10.8 |
| 2004/0212310 A1 | 10/2004 | Ito et al. |
| 2009/0003007 A1 * | 1/2009 | Kitagawa ........... H05B 33/0815 362/464 |
| 2011/0006689 A1 | 1/2011 | Blanchard et al. |

FOREIGN PATENT DOCUMENTS

| | | |
|---|---|---|
| DE | 19901520 A1 | 7/2000 |
| DE | 10020441 A1 | 10/2001 |
| JP | S5881833 A | 5/1983 |
| JP | H11129811 A | 5/1999 |
| JP | 2001130319 A | 5/2001 |
| WO | 9519276 | 7/1995 |

\* cited by examiner

BRAKE LIGHT WITH ADAPTIVE SHUNT ARRANGEMENT

CROSS-REFERENCE TO RELATED APPLICATIONS

This application is a continuation of U.S. patent application Ser. No. 14/301,078, filed Jun. 10, 2014, which claims priority from U.S. provisional patent application No. 61/833,011, filed Jun. 10, 2013, and U.S. provisional patent application No. 61/969,609, filed Mar. 24, 2014, the entire contents of which are incorporated herein by reference.

FIELD

This document relates to the field of brake lighting in vehicles, and particularly to flashing or pulsating brake lights.

BACKGROUND

Brake lights are standard equipment in many vehicles including automobiles designed to drive on public roads in the United States or other countries. Brake lights may be provided in any of various forms, but are typically provided as incandescent bulbs or LEDs. The term "brake light" as used herein is intended to refer to any illuminating device intended to indicate braking, deceleration, or stopping of a vehicle, including incandescent bulbs or LEDs. Brake lights are sometimes referred to by other terms such as "stop lamps" or "brake lamps", and such terms are used interchangeably herein.

Stop lamp flasher devices of various designs are known in the art. Stop lamp flasher devices are typically configured to turn a CHMSL (center high mounted stop lamp) or other brake light on and off rapidly (or vary the power output of the brake light) the in order to alert a driver behind a stopping vehicle that the flasher-equipped vehicle is stopping. The flashing lights associated with stop lamp flasher devices generally obtain the attention of a trailing driver more quickly, thus providing the trailing driver with additional time to respond to the braking vehicle in front of them. In addition, persons who frequently drive in stop-and-go city traffic may become less responsive to ordinary brake lights, and the flashing lights associated with stop lamp flasher devices may be used to gain the attention of these drivers on shorter notice. An exemplary stop lamp flasher device is shown in U.S. Pat. No. 5,565,841, the entire contents of which are incorporated herein by reference.

Many stop lamp flasher devices do not actually turn the brake light on and off, but instead modulate or vary the power output by the brake light. For example, a stop lamp flasher device may rapidly vary the power output from a brake light between 100% and 50% (i.e., a first power output being 100% and a second power output being 50% of the first power output). As such, stop lamp flasher devices may be considered to "pulse" the brake light instead of flashing the brake light. However, because this pulsation is relatively rapid, a human is typically unable to determine whether the brake lamp is pulsating or flashing. Therefore, the terms "pulse" and "flash" are used interchangeably in this document to simply refer to some relatively rapid variation in the power output from a vehicle, whether between 0% and 100%, 50% and 100%, 40% and 90% or any other power variation.

Most stop lamp flasher devices are offered for sale in the aftermarket and either installed by the owner of an existing vehicle or by dealers prior to the sale of a vehicle. Thus, existing stop lamp flasher devices are typically installed on new or used vehicles at the time of sale, after the vehicle has left the manufacturer's factory. One issue with existing stop lamp flasher devices is that they may not operate properly with certain modern automobiles that include automated computer diagnostic capabilities. In particular, when a stop lamp flasher device is installed in these automobiles, the fault detection circuitry may improperly detect that there is a problem with the brake light. For example, the fault detection circuitry may not expect any varying current across the brake light during braking, and therefore may consider varying current across the brake light as a fault. When the fault detection circuitry improperly detects a problem with the brake light, a warning indication may be presented to the vehicle operator on the dash or other vehicle location. This indication may be annoying to the vehicle operator and cause concern even though the stop lamps are indeed functioning properly. Alternatively, a detected problem with the brake lamp may cause some vehicles to suspend operation of the brake lamp for some period of time.

Another potential issue with stop lamp flasher devices is that the aftermarket installation process involves cutting the brake light wiring (i.e., cutting wires in a wire harness that leads to the rear stop lamps). After the brake light wiring is cut, the stop lamp flasher device is coupled to the brake light wiring in order to effect the desired pulsing effect for the CHMSL or one or more additional brake lights. However, the process of cutting the brake light wiring and installing additional circuitry is not without issues. For example, a dealer or new car owner may find it stressful or somehow improper to cut into operational brake light wiring of a new vehicle in order to insert additional circuitry. Moreover, it is typically time consuming for even well trained technicians to identify the brake light wiring on various vehicles and insert the stop lamp flasher device in the appropriate location. Therefore, existing stop lamp flasher devices leave room for improvements with respect to ease of installation. Additional opportunities to improve existing stop lamp flasher devices are presented with respect to size reduction and production costs, and easier and quicker installation of the devices.

Yet another issue with existing stop lamp flasher devices is that they may not always effectively pulse the lights in different vehicle types having different types of stop lamps and different numbers of brake lights. For example, if the stop lamps are to be pulsed by repeatedly changing the light intensity from bright to dim, without turning the stop lamps completely on and off, existing stop lamp flasher devices may only be configured to work with certain vehicles having certain types of stop lamps. For example, a particular stop lamp flasher device may be configured to work only with LED stop lamp arrangements, but not with incandescent stop lamp arrangements, or with stop lamps having only a certain number of stop lamps.

In view of the foregoing, it would be advantageous to provide a stop lamp flasher device that works with modern vehicles that include fault detection circuitry for the brake light circuit. It would be advantageous if such device could be easily installed in an existing vehicle by simply coupling additional circuitry to the brake light circuit in the vehicle. It would also be advantageous if the stop lamp flasher device could be produced at relatively little cost and with a relatively small package size. Additionally, it would be advantageous for the improved stop lamp flasher device to be configured for use with vehicle braking circuits on numerous different vehicles, regardless of the number of stop lamps used by the vehicle or the type of stop lamp used.

SUMMARY

In at least one embodiment, a device is configured for installation in an existing vehicle brake light circuit having at least one brake light, a first line connected to a first side of at least one brake light, and a second line connected to a second side of the at least one brake light. The device includes a first lead, a second lead and a third lead, the first lead configured for connection to the first line of the vehicle brake light circuit, the second lead and the third lead configured for connection to the second line of the vehicle brake light circuit, the first lead and the second lead defining a device output, the device output configured for connection in parallel with the at least one brake light. The device further includes a control unit and a switching member. The switching member is provided in a shunt path connected in parallel with the device output and controlled by the control unit, the switching member configured to operate in a first state or a second state. The control unit is configured to control the switching member such that (i) a current through the shunt path is reduced when the switching member operates in the first state and thus a current through the at least one brake light is increased when the switching member operates in the first state, and (ii) the current through the shunt path is increased when the switching member operates in the second state and thus the current through the at least one brake light is reduced when the switching member operates in the second state.

In at least one embodiment, a brake light control unit is connected to a vehicle brake light circuit including at least one brake light, a first line connected to a first side of the at least one brake light, and a second line connected to a second side of the at least one brake light. The brake light control unit includes a first lead, a second lead, and a third lead. A first switching member is connected between the first lead and the second lead and in parallel with the at least one brake light. The first switching member is provided in a shunt path extending between the first line and the second line of the vehicle brake light circuit. A second switching member is connected between the second lead and the third lead and in series with the at least one brake light. A control unit is coupled to the first switching member and the second switching member. The control unit is configured to (i) detect a braking voltage on the first line of the vehicle brake light circuit, (ii) control the second switching member such that a current through the second switching member is substantially constant when the braking voltage is detected on the first line, and (iii) control the first switching member such that a current through the at least one brake light cycles between a first magnitude and a second magnitude that is less than the first magnitude after the braking voltage is detected on the first line.

In at least one embodiment a method of controlling illumination of a brake light in a brake light circuit of a vehicle is performed. The brake light circuit of the vehicle includes the at least one brake light and brake light wiring, the brake light wiring including a first line connected to a first side of the at least one brake light and a second line connected to a second side of the at least one brake light. A shunt path is installed in parallel with the brake light between the first line and the second line, the shunt path including a switching member. A control unit is installed that is also connected to the switching member. The control unit is configured to control the switching member such that (i) a current through the shunt path is reduced when the switching member operates in the first state and thus a current through the at least one brake light is increased when the switching member operates in the first state, and (ii) the current through the shunt path is increased when the switching member operates in the second state and thus the current through the at least one brake light is reduced when the switching member operates in the second state.

The above described features and advantages, as well as others, will become more readily apparent to those of ordinary skill in the art by reference to the following detailed description and accompanying drawings. While it would be desirable to provide an adaptive shunt for a pulsating brake light that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
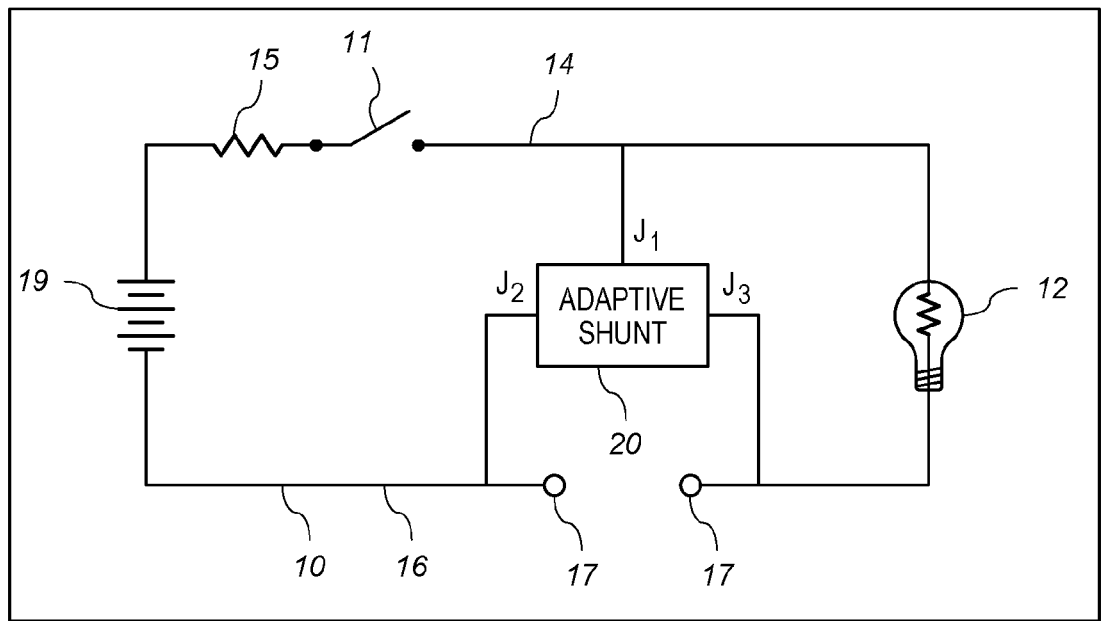
FIG. 1 is a high level schematic of a vehicle brake light circuit with an adaptive shunt device positioned in the brake light circuit.

With reference now to FIG. 1, an electronics device 20 is connected to a braking circuit 10 within a vehicle 8. The electronics device 20 is connected to the vehicle braking circuit 10 between a supply line 14 and a return line 16 of the vehicle braking circuit 10. In the embodiment of FIG. 1, the return line of the vehicle braking circuit is cut or otherwise severed (as noted at location 17), and the electronics device 20 is connected in series with the return line 16. A brake switch 11 is provided on the supply line 14 along with some vehicle load 15. When an operator of the vehicle 8 depresses the brake pedal, the brake switch 11 is closed, connecting the supply line 14 to the vehicle battery 19, thus providing a voltage on the supply 14 (which may also be referred to herein as the "brake detection line 14). This results in current flowing through the vehicle braking circuit 10 and illumination of the brake light 12. As described in further detail below, the electronics device 20 is configured to effect pulsing of the brake light upon detection of a voltage on the brake detection line 14.

While the vehicle 8 shown in FIG. 1 may be an automobile, it will be recognized by those of ordinary skill in the art that the device 20 may be coupled to any other type of vehicle, including a motorcycle, truck, bicycle, boat, snowmobile, etc. Furthermore, while FIG. 1 shows one exemplary representation of a the brake light circuit 10, it will be appreciated by one of ordinary skill in the art that the device 20 may be coupled to other brake light circuits that may be configured in a different manner. Also, more than one term may be used herein to generally refer to a disclosed component. For example, the electronics device 20 referenced above may also be referred to herein by other terms such as "electronics module", "adaptive pulse unit", "adaptive shunt device", and "programmable shunt device".

Low Side Embodiment of Adaptive Shunt Device

Figure 2:
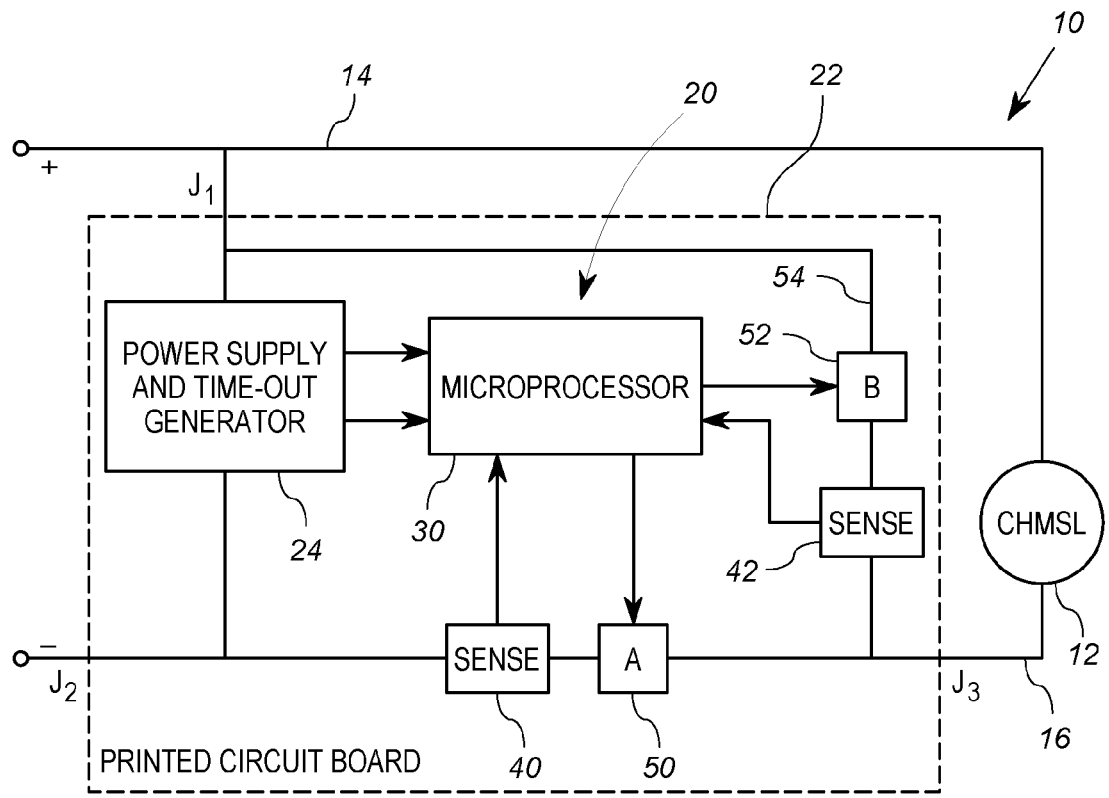
FIG. 2 is a block diagram of one embodiment of the adaptive shunt device positioned in the brake light circuit of FIG. 1.

With reference now to FIG. 2, the electronics device 20 is provided on a relatively small printed circuit board (PCB) 22 having numerous electronic components positioned thereon. The electronic device 20 includes a power supply 24, a microprocessor 30, current sensors 40 and 42, and transistors 50 and 52. Various additional electronic components may also be provided on the PCB 22 to support or feed the main electronic components, as will be recognized by those of ordinary skill in the art. Examples of such additional components include diodes, resistors, capacitors, inductors, regulators, inverters, op-amps, headers and connectors.

The footprint of the PCB 22 is generally less than about 0.5"×1.5". The PCB 22 is also relatively thin, being significantly less than 0.5", such as about 0.1" in thickness. The base material for the PCB 22 may have a minimum FR-4 with a UL 94V-0 flammability rating. The industry-standard overlying layers and coatings used in the manufacture of the PCB 22 will meet the same specification. The electronic components provided on the PCB 22 are configured for reliable operation in excess of 85 degrees Celsius, or even 105 degrees Celsius.

The microprocessor 30 is connected to and receives a bias voltage from the power supply 24. The power supply 24, in turn, receives power from the supply line 14 (i.e., the brake detection line) of the vehicle braking circuit 10. The microprocessor 30 may be any of various suitable microprocessors available from different manufacturers, as will be recognized by those of ordinary skill in the art. In at least one embodiment, the microprocessor 30 is a PIC-type embedded microprocessor.

The microprocessor 30 is connected to the current sensors 40 and 42 and the transistors 50 and 52. In particular, the microprocessor 30 receives input from the current sensors 40 and 42, and delivers control signals to the transistors 50 and 52. The transistors 50 and 52 are of adequate ratings for switching and current control in the circuitry of an automotive brake light system. The current sensor 40 and transistor 50 are provided in series in the return line 16 (which may also be referred to herein as the "ground line") of the vehicle braking circuit 10. The current sensor 42 and transistor 52 are arranged in a branch that is parallel to the CHMSL 12 in the vehicle braking circuit 10. However in other embodiments, the current sensors 40, 42 and the transistors 50, 52 may be arranged differently. For example, in the embodiment of FIG. 3, described below, the current sensor 40 and transistor 50 are provided in series in the supply line 14.

Three suitable color-coded connecting wires (represented by leads J1, J2 and J3) extend from pads located directly on the PCB 22. The color-coded leads may be any of various appropriate colors as determined by the manufacturer, such as red for J1, yellow for J2, and black for J3. Of course any of various other color schemes may be adopted by the manufacturer. The color-coded connecting wires include two wires configured to provide a series connection in the low side (return line/ground/negative) of the vehicle brake light circuitry, and one wire configured for tapping into the high side (supply line/positive) of the vehicle brake light circuitry. It will be recognized that in other embodiments, the series connection may be on the high side (e.g., see FIGS. 4 and 5) and the low side may be a tap connection or a vehicle chassis connection.

The color coded connection wires are protected on the device 20 with an outer covering of double-wall heat shrink tubing. Device information such as serial numbers or trademarks may be printed or embossed on this covering. The coverings provide protection against environmental degradation, accidental damage, and accidental shorting of the connecting wires.

Operation of Electronics Device

In operation, the electronics device 20 operates as an adaptive current-sense and control-pulse generator with timed functional lock-out and integrated fail safe design. The device 20 is a three-terminal device which has self-adjusting characteristics in regards to load matching within highly variable parameters, resulting in a single model designed to fit a wide variety of automotive applications.

Figure 3:
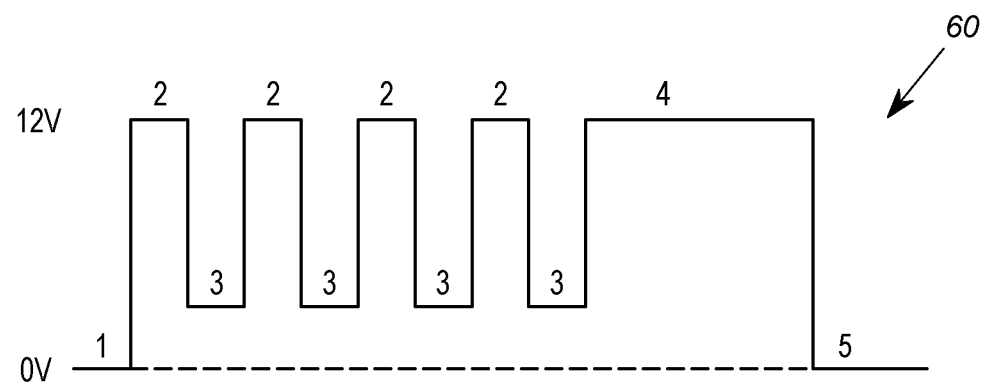
FIG. 3 is a mode versus waveform graph showing the voltage output by the adaptive shunt device of FIG. 2 across the vehicle CHMSL, wherein numbers are used in the diagram to indicate which mode is active during each part of a typical waveform generated by the adaptive shunt device.

With reference now to FIGS. 2 and 3, the electronics device 20 normally operates within a series of five or six distinct modes when it is triggered by voltage and current on the lines connected to the CHMSL 12 or other brake lights. Also included is the failsafe mode, intended to engage only upon unexpected or accidental damage to the device. Operational modes of the device include the following:

1. Off (CHMSL line not active)
2. Observe and Measure. (CHMSL line active, "pulse high")
3. Control and Shunt (CHMSL line active, "pulse low")
4. Bypass (CHMSL on full, no pulse activity)
5. Timed Lock-Out (CHMSL operates as if device is not present)
6. Fail Safe. (CHMSL operates as if device is not present.)

An explanation of each of the above modes is provided in the following paragraphs with reference to FIG. 3, which shows a waveform 60 representing an exemplary voltage across the CHMSL 12 in each of modes 1-5.

1. Off Mode. This is the mode when the vehicle brake light is not active, the vehicle is off, or running, but the brakes are not yet applied. No light is emitted from the CHMSL or other vehicle brake lights in this mode. As noted in FIG. 3, the voltage across the CHMSL is zero.

2. Observe and Measure Mode. When the brake pedal is depressed by an operator of the vehicle, and the vehicle brakes are applied, the supply line and return line of the vehicle braking circuit 10 become active and power is available. The CHMSL is activated by either one of 2 means:

A. The high side positive line has a voltage switched to that line (e.g., see brake switch 11 of FIG. 1), activating the CHMSL to full brightness.

B. Or alternatively, depending upon the automotive model, the low side, negative, or "ground" lead is switched to allow current to flow, achieving the same result: the CHMSL lights to full brightness.

The electronics device 20 is initiated during this mode. Power flows to the power supply 24 and the control circuitry internal to the electronics device charges. This activates the microprocessor 30, which begins its firmware program. The microprocessor firmware starts within a few milliseconds after power is provided to the power supply 24. The "A" transistor 50 is also activated to allow for full flow of current through to the CHMSL 12. The electronics device 20 does not yet affect the current going to the CHMSL, but does observe and register that it is active and measures how much electrical current the CHMSL is drawing. As noted in FIG. 3, the voltage across the CHMSL is high (e.g., +12V).

3. Control and Shunt Mode. After a pre-determined time period, the microprocessor 30 switches to the control and shunt mode. In this mode, the microprocessor 30 now controls the overall current from the incoming line (e.g., line 14 in FIG. 1), limiting the current to substantially the same amount that was detected in the previous step/mode. It does this by limiting or otherwise controlling the current passing through transistor "A" 50 (which may be thought of as "throttling" the current).

On another side of the electronics device 20, another electrical path 54 connected in parallel to the CHMSL 12, is activated. This path 54, which may be referred to herein as the "shunt path", siphons off a pre-determined portion (i.e., ratio) of the current flowing in the brake detection line 14, through a transistor "B" 52, effectively shunting the siphoned portion of the current to the return line 16 before it can enter the CHMSL 12.

The microprocessor 30 controls both the shunt path and the return path simultaneously via the transistors "A" and "B". In particular, the microprocessor 30 controls and holds the ratio of current flowing through transistor "A" 50 versus transistor "B" 52 at a determined desired level. As a result, the CHMSL 12 receives only a portion of the power it received during the previous mode (i.e., a low voltage), which causes the CHMSL 12 to dim, but not extinguish. For example, the low voltage across the CHMSL 12 may be between +2V and +4V. This low voltage is maintained for a short period of time and then the electronics device 20 returns to mode #2 (i.e., the "observe and measure" mode), as shown in FIG. 3. Repeated changes in the voltage across the CHMSL 12 from high to low results in the desired "pulse" in the light output of the CHMSL 12.

The electronics device 20 automatically adjusts the electrical current that is shunted based on the amount that was previously measured, so the pulsing action of the CHMSL 12 is exactly the same regardless of whether the load 12 is multiple incandescent bulbs or a single LED. This action continues for a pre-set amount of time, then the electronics module 20 returns to mode #2 (i.e., the "observe and measure" mode). After four (or some other predetermined number) of these "pulse" cycles are completed, the electronics device 20 then enters the 4$^{th}$ mode, described below.

4. Bypass Mode. After four pulses from mode 2 to mode 3 are completed, as shown in FIG. 2, and the brake pedal remains depressed by the operator of the vehicle, the voltage across the CHMSL 12 goes high and stays high. In this mode, the CHMSL 12 remains constantly lit without pulsing, until the CHMSL is signaled off by the vehicle's systems (i.e., until the brakes are released).

5. Timed Lock Out Mode. After the vehicle brake pedal is released and the CHMSL 12 unit has been extinguished, a time-out window of about 2 seconds is generated during which the electronics module 20 will not allow the pulsing effect to re-initiate, even if a new braking action is occurring. This is in order to prevent repeated, excessive pulsing during times of multiple short term braking operations ("pumping" the brakes, or heavy stop-and-go traffic).

6. Fail Safe Mode (not shown in FIG. 3). In the rare case of an adaptive shunt unit having an internal electronic component failure, this mode still allows for normal operation of the CHMSL. In this mode, the control unit 30 powers down and does not perform any processing until the unit is reset by a technician. Within this mode transistor "A" 50 continues default operation in a full "on" mode (i.e., current pass), and transistor "B" 52 continues default operation in a full "off" mode (i.e., current block).

High Side Embodiment

Figure 4:
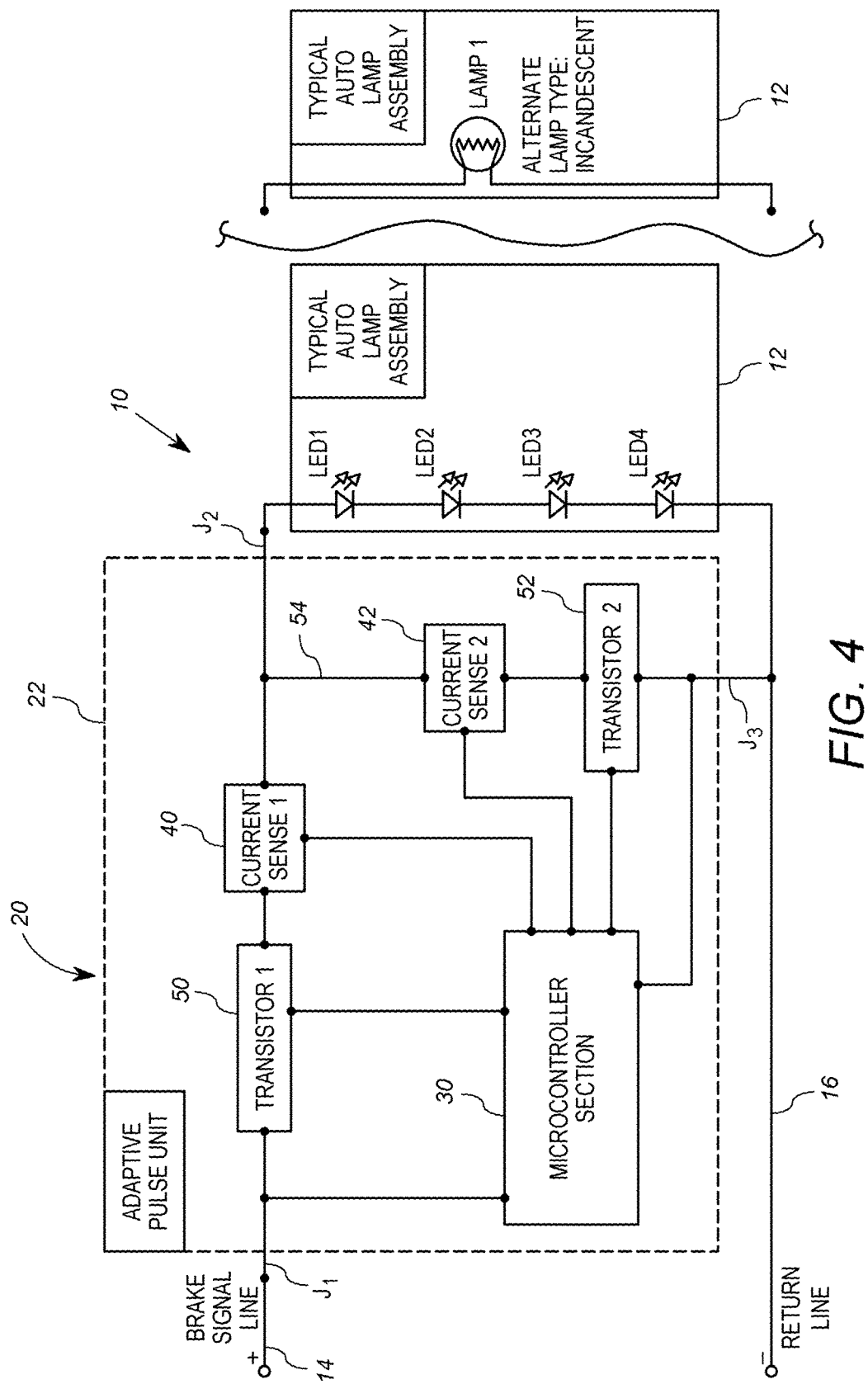
FIG. 4 is a circuit block diagram of an alternative embodiment of the adaptive shunt device.

A second exemplary embodiment of the electronics module 20 in a vehicle braking circuit 10 is shown in FIG. 4. The components shown in FIG. 3 are generally the same as those shown in FIG. 1, but in FIG. 4, the current sensor 40 and transistor 50 are arranged on the high side of the vehicle braking circuit 10, and the power supply is incorporated into the microprocessor. Similar to the arrangement described above in FIGS. 1-3, in the embodiment of FIG. 4, the electronics module 20 may be configured to work in two alternating modes for four pulses of the CHMSL 12 before the CHMSL light is held constant. Thereafter the pulsing action is blocked from repeating for approximately two seconds.

In a first mode (i.e., mode #2 described above), when the automobile's brakes are applied, a high signal is sent to light the CHMSL 12 or other braking lamp. The electronics module 20 then provides for a current measurement using current sensor 40, without influencing the usual activation of the CHMSL 12 in any way. This is the "observe and measure" mode. In this mode, transistor 50 is fully "on", and a current measurement is made by the microcontroller 30. The CHMSL 12 or other brake lamp is fully lit during this operation. The result of the current measurement is stored in an internal register of the electronics module 20.

In a second mode (i.e., mode #3 described above), as the automobile's brakes are still applied, a low signal is sent to the CHMSL. In this mode, the unit activates both transistors 50 and 52 at the same time. Transistor 50 is controlled in such a way that the current passing through it is exactly the same value as was measured in the previous mode. This may be referred to as "constant current control". At the same time, transistor 52 is activated to a level where a predetermined percentage of the total current that is passing through transistor 50 is directed back to ground without passing through the CHMSL 12. This causes the lamp to dim briefly by the loss of that percentage of the total current, thus resulting in a pulse of the CHMSL. The CHMSL lamp does not extinguish completely, as the remaining current that is not shunted is sufficient to light the CHMSL lamp to partial brightness.

Additional modes as also included in operation of the electronics module 20. One exemplary mode is the "lock-out" mode which prevents the above cycle from repeating more often than every two seconds. During this time, the lamp operates in normal mode, and the electronics module is "transparent" as it does not cause pulsing of the lamp.

Another exemplary mode of the electronics module 20 is the "stealth" mode. In the stealth mode the electronics module turns transistor 50 on to allow the automobile's computer to scan the CHMSL or other brake lamp for defects. This is another "transparent" mode wherein operation is the same as if the electronics module 20 was not incorporated into the vehicle braking circuit 10.

Advantageously, in the above embodiment, because the current to the CHMSL 12 is first measured as if the electronics device 20 were not connected to vehicle braking circuit 10, the value of the load does not matter. The electronics module 20 automatically adapts to the load provided by the braking lamps, so the effect remains the same regardless of what type of lamp is used (e.g., LED or incandescent lamps), or the number of lamps in the brake light.

Schematic Arrangement for High Side Embodiment of Adaptive Shunt Device

Figure 5:
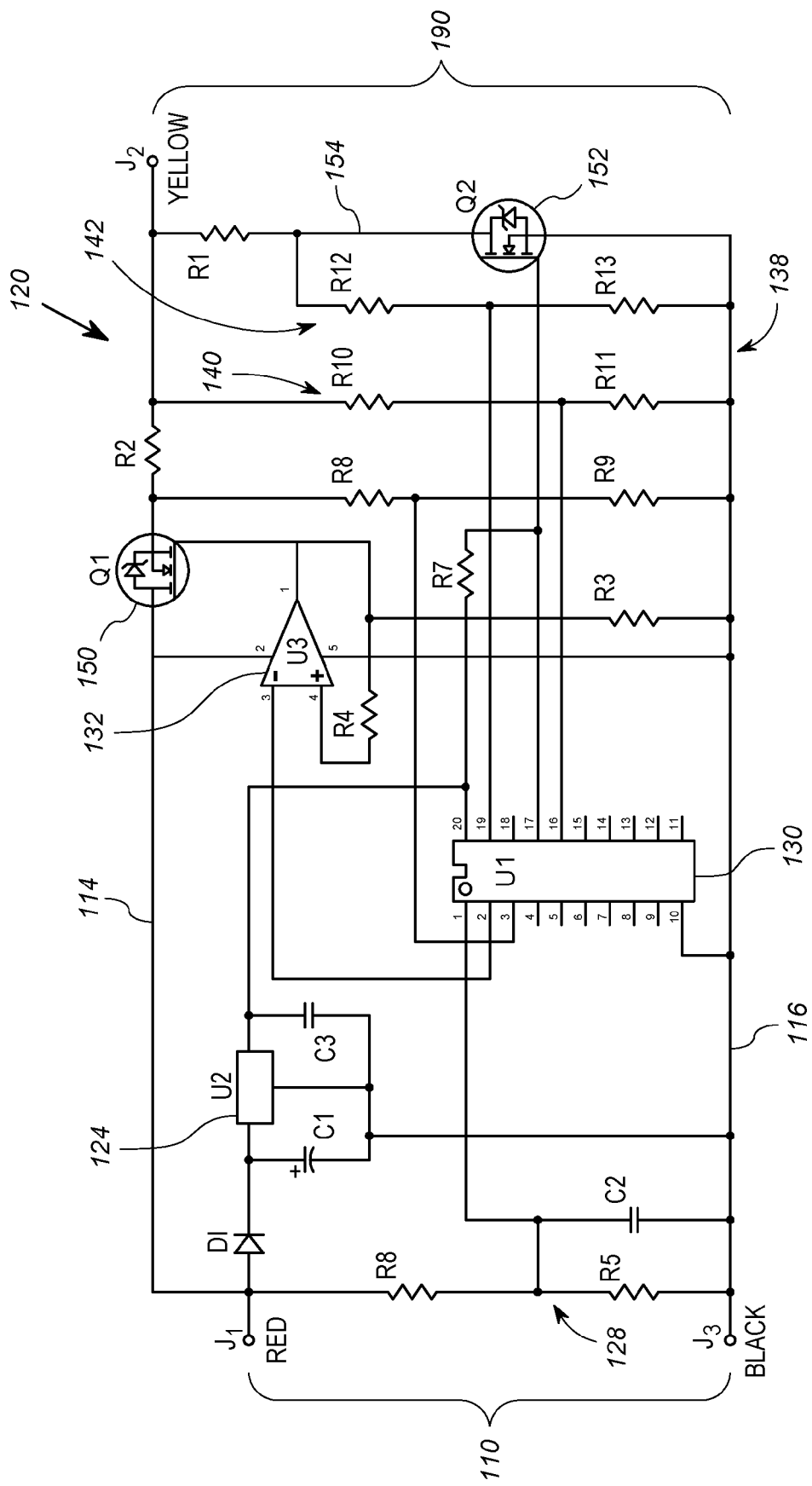
FIG. 5 is a schematic of the adaptive shunt device of FIG. 4.

With reference now to FIG. 5, an embodiment of the adaptive shunt device 120 is shown in a schematic diagram. As noted previously, all of the electrical components of the adaptive shunt device 120 may be provided on a single printed circuit board. The adaptive shunt device includes an input 110 defined between leads J1 and J3, and output 190 defined between leads J2 and J3. Lead J1 and J2 are configured for connection to the brake detection line (i.e., line 14 of FIG. 4), and J3 is configured for connection to the return line (i.e., line 16 of FIG. 4). Because J1 and J2 are connected directly in series on the brake detection line, line 114 of FIG. 5 may also be referred to herein as the brake detection line or supply line. Additionally, because J1 is directly tied to the return line, line 116 may be referred to herein as the return line or the ground line.

The adaptive shunt device generally includes a DC voltage regulator 124, a power-up voltage divider 128, a microprocessor 130, an operational amplifier 132, a resistive network 138, a first switching member in the form of a first transistor 150 (Q1), and a second switching member in the form of a second transistor 152 (Q2). Lead J1 is connected to the voltage regulator provided generally by device U2. This voltage regulator provides a +5V Vcc for a microcontroller U1. The power-up voltage divider 128 is provided by resistors R5 and R6. This voltage divider 128 provides a wake-up/initial power-up function for the microcontroller 130 immediately after voltage is present on the supply line 14 of the vehicle braking circuit. Voltage divider 128 also serves to determine whether a voltage present on the brake detection line 114 is due to application of the vehicle brake, or a signal from a diagnostic unit in the vehicle. In particular, if the voltage present on the brake detection line 114 is between twelve and fourteen volts, an indication is provided that the vehicle brake circuit is coupled to the vehicle battery as the result of closure of the brake switch. On the other hand, if the voltage on the brake detection line 114 is significantly lower than the vehicle battery voltage, an indication is provided that the voltage is the result of a test signal from a diagnostic component. In at least one embodiment, the microcontroller 130 only performs processing when the brake switch is closed and the vehicle braking circuit is connected to the vehicle battery.

The microcontroller 130 provides a control unit for the adaptive shunt device 120. Any number of different microcontrollers or other electronic components may be used to provide the control unit, as will be recognized by one of ordinary skill in the art. The microcontroller 130 receives power from the voltage regulator 124 and the voltage divider 128. The microcontroller also receives inputs from the resistive network 138 in order to monitor activity within the device 120. The microcontroller includes outputs to the operational amplifier 132, which controls operation of the first transistor 150, and outputs to control operation of the second transistor 152.

The resistive network 138 is configured to provide a current sensor for both the brake detection line 114 and the shunt path 154. In particular, resistors R2, R8, R9, R10 and R11 provide a current sensor 140 for the brake detection line 114. Similarly, resistors R1, R12 and R13 provide a current sensor 142 for the shunt path 154. While these resistors provide indications of voltage (not current) across respective resistors to the microcontroller 130, the microcontroller 130 is configured to determine the magnitude of respective currents flowing through the resistors based on the known values of the resistors and the input voltages.

The first transistor 150 is positioned in the brake detection line 114, in series with the output 190 of the adaptive shunt device 120. The first transistor 150 may be referred to herein as the "brake line transistor". In the embodiment of FIG. 5, the first transistor 150 is provided by a p-channel MOSFET device. In the event that no voltage (i.e., low voltage) is provided to the gate of the first transistor 150, the transistor remains in an "on" state such that current is allowed to flow across the transistor in the brake detection line 114. However, when the adaptive shunt device 120 is operational, the control unit 130 is configured to control the first transistor 150 via the operational amplifier 132 and restrict current flow across the first transistor 150, when appropriate. While a MOSFET transistor has been disclosed herein as the first transistor 150, it will be recognized that different types of transistors or even differing types of switching devices may be used for the first switching device.

The second transistor 152 is positioned in the shunt path 154, parallel with the output of the adaptive shunt device 120. The second transistor 152 may be referred to herein as the "shunt transistor". In the embodiment of FIG. 5, the second transistor 152 is provided by a p-channel MOSFET device. In the event that no voltage (i.e., low voltage) is provided to the gate of the second transistor 152, the transistor remains in an "off" state such that current is restricted from flowing across the transistor in the shunt path 154. However, when the adaptive shunt device 120 is operational, the control unit 130 is configured to control the second transistor 152 and allow current flow across the second transistor 152, when appropriate. While a MOSFET transistor has been disclosed herein as the second transistor 152, it will be recognized that different types of transistors or even differing types of switching devices may be used for the first switching device.

In operation, the adaptive shunt device 120 of FIG. 5 is configured to control the illumination of a brake light in a brake light circuit of a vehicle, thereby resulting in pulsation of the brake light. Upon application of the vehicle brakes, the brake switch closes, and a voltage is present on the brake detection line 114. The control unit 130 is then powered up. Upon power-up, the control unit 130 maintains the first transistor 150 in an "on" state, allowing current to flow through the brake detection line 114. The control unit 130 does not attempt to control the current through the first transistor 150 during this initial time period (e.g., 125 milliseconds after application of the braking voltage to the brake detection line). However, during this initial time period, the control unit 130 observes and measures the magnitude of the current flowing through the brake detection line 114. The control unit 130 is configured to determine this current through the brake detection line 114 based on the inputs to the control unit 130 from the current sensor 140. Also during this initial time period, the control unit 130 maintains the second transistor 152 in an "off" state, blocking current from flowing through the shunt path 154. Thus, the current through the brake detection line 114 is directed in full to the output 190 of the adaptive shunt device 120 during the initial/first time period, resulting in full illumination of the brake light (or brake lights) connected to the adaptive shunt device 120.

After the initial time period is complete, a second time period is entered where the control unit turns the second transistor 152 "on", and the first transistor 150 acts as a current limiting device. This second time period is about the same length as the first time period (e.g., about 125 ms). When the second transistor is turned on, current is allowed to flow through the shunt path 154. However, this shorting effect through the shunt path does not result in excessive current draw because the control unit 130 limits the total current allowed to flow through the first transistor 150 during this time. In particular, the control unit 130 controls the first transistor 150 to limit current flow during the second time period to substantially the same as the current flow that occurred during the first time period (e.g., the current through the first transistor 150 may be limited during the second period to no more than that measured during the initial time period). Thus, the first transistor 150 acts to throttle back (i.e., limit) the current through the brake detection line 114 when the shunt path 154 is active. As a result, the current through the brake detection line 114 remains substantially constant during the first and second time periods. Because current is allowed to flow through the shunt path 154 during this second time period, reduced current flows through the output 190 during the second time period (as compared to the initial time period), and the brake light coupled to the output 190 is dimmed (in comparison to the brightness during the initial time period). Power output from the brake lamp during the second time period may be reduced to only a fraction of that occurring during the first time period (e.g., 30%, 40%, 50%, etc.).

After the second time period is complete, the adaptive shunt device 120 enters a third time period where the microcontroller 130 operates in the same manner as the first time period, with no current flowing through the shunt path 154 and the brake light being fully illuminated with full current flowing through the first transistor 150. Thereafter, the control unit 130 continues to process through a number of additional time periods wherein the second switching member 152 is cycled between the "on" and "off" states in each successive time period (with the first switching member 150 cycled between the "current limiting" and "fully on" states, in compliment to operation of the second switching member). As a result, the current through the at least one brake light cycles between a first magnitude and a second magnitude that is less than the first magnitude after the braking voltage is detected on the brake detection line. After a predetermined pulsing period is complete (e.g., 1 or 2 seconds), the cycling through "on" and "off" states of the second switching member 152 is complete, and the control unit 130 turns the second switching member 152 to the "off" state for the remainder of braking. Therefore, the brake lights remain illuminated with full power following the pulsing period (e.g., after two seconds of pulsation).

The exemplary adaptive shunt device 120 in the arrangement of FIG. 5 provides a number of advantages over various prior art brake light pulsation devices. For example, the adaptive shunt device 120 is configured for use with modern vehicles having complex vehicle lighting systems. These complex vehicle lighting systems include various diagnostic scans such as latching or CAN scans. With latching, the vehicle computer senses current during braking and interprets a low current through the brake light as a short, which may result in the brake light being turned off for some predetermined time such as until the vehicle is restarted, the brakes are reapplied, or some other period of time. With CAN scans, the CAN bus of the vehicle periodically sends out a small test pulse of voltage through the brake light. This test pulse of voltage is sufficiently large to detect whether any brake lights are malfunctioning, but sufficiently small to prevent any of the brake lights from illuminating. Other examples of complex vehicle lighting systems include arrangements wherein additional accessories tied to the brake detection line. In each of these complex vehicle lighting systems, the adaptive pulse device 120 is configured to detect the current and voltage demands required by these systems and adjust any output voltage or current to satisfy such demands. For example with a CAN scan, the first transistor 150 is pre-biased to be fully "on" even before the control unit 130 is active, and this allows the adaptive shunt unit to be "transparent" to such CAN scans, as thought the unit is not even connected into the vehicle braking circuit. Accordingly the diagnostic scan does not indicate a problem with the brake lamp when there is not one, and may still to detect any real problems with the lamp when they occur.

Yet another example of an advantage provided by the adaptive shunt device is self-adjustment to different load demands, depending on how the CHMSL or other brake lamp is illuminated, such as LED versus incandescent. Additionally, the adaptive shunt device 120 allows for precise and maker-adjustable partial illumination during the dimming periods of the pulsing cycle, thus allowing the device 120 to meet any of various local, state or federal rules which may prohibit the brake lamp from being shut completely off during the pulsing cycle or braking in general. In addition to the above, the adaptive pulse device incorporates various circuit elements to ensure that in the event of electronic component failure, the unit will not cause damage to the vehicle or cause the CHMSL (or other brake light) to fail to work in normal mode.

Method of Controlling Illumination of a Vehicle Brake Light

Figure 6:
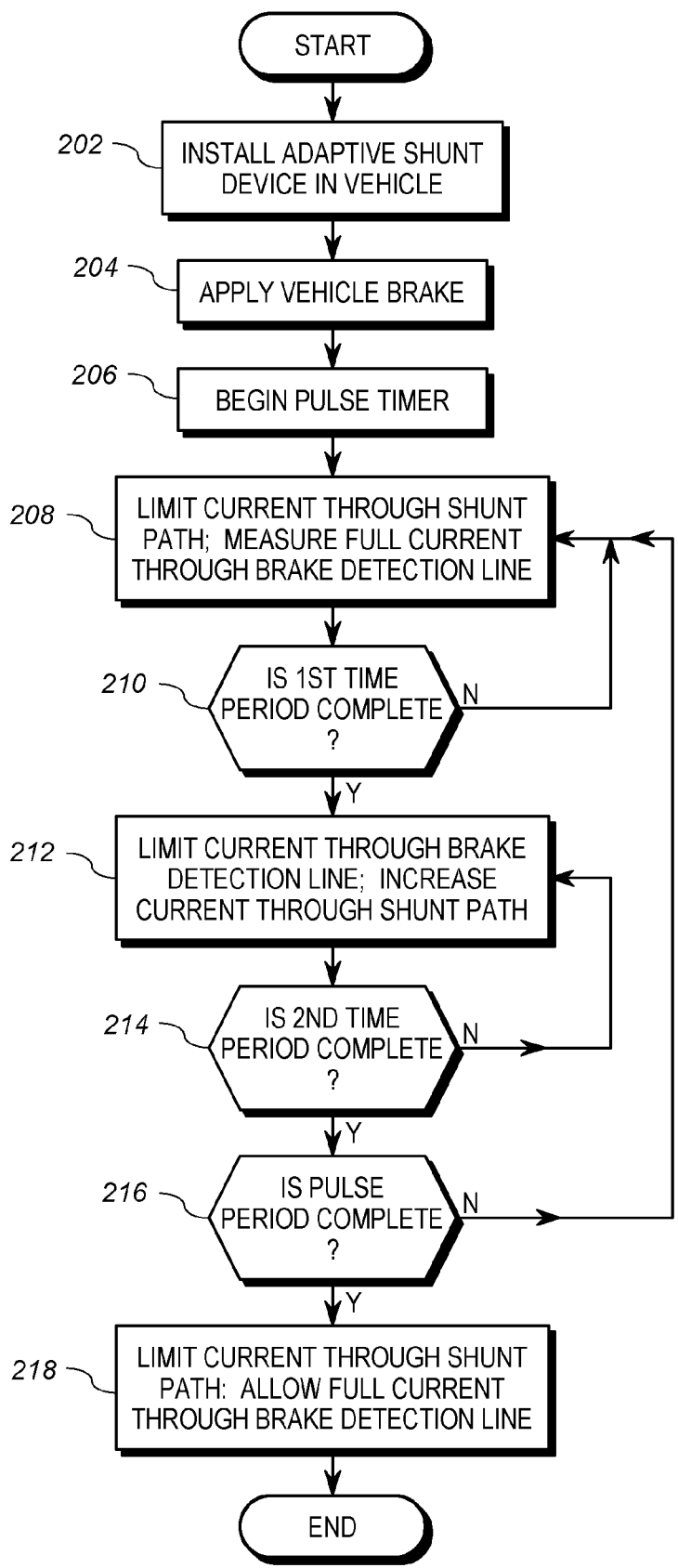
FIG. 6 is a block diagram of a method of controlling illumination of a brake light in a brake light circuit of a vehicle using the adaptive shunt device of FIG. 5.

With reference now to FIG. 6, a method of controlling a brake light in a vehicle is shown. The method begins with step 202 where the adaptive shunt device is installed in a vehicle. Installation of the adaptive shunt device in a vehicle results in a shunt path being provided in parallel with the brake light. In step 204, the vehicle brake is applied resulting in a voltage being present on the brake detection line. The presence of this voltage begins a timer in step 206. Next, in step 208, full current is allowed to flow through the brake detection line by the first switching member during a first time period following application of the vehicle brakes. At the same time, current through the shunt path is limited by the second switching member during the first time period. As a result, the vehicle brake light is illuminated at full power during this first time period. Then, in step 210 a determination is made whether the first time period is complete. If the first period is not complete in step 210, the method continues with full illumination of the brake light in step 208. If the first time period is complete in step 210, the method moves to step 212 and the first switching member acts to limit current flow through the brake detection line during a second time period. At the same time, the second switching member acts to allow increased current through the shunt path during the second time period following the first time period. Also during this second time period, the current on the brake detection line is maintained at a substantially constant magnitude as during the first time period, as described above. As a result of some of the current being diverted through the shunt path, the vehicle brake light is illuminated at a lower power level during the second time period. As noted in step 214, the method continues with low power illumination of the brake light during this second time period. Then In step 216, a determination is made whether the pulsing period is complete. The method continues to cycle through steps 208 through 216 until a determination is made that the pulse period is complete. Thereafter, in step 218 the brake light defaults to a full illumination mode for the remainder of vehicle braking. The method is then repeated (returns to start) if the operator of the vehicle reapplies the brakes at a later time.

Dual Lead Embodiment

Figure 7:
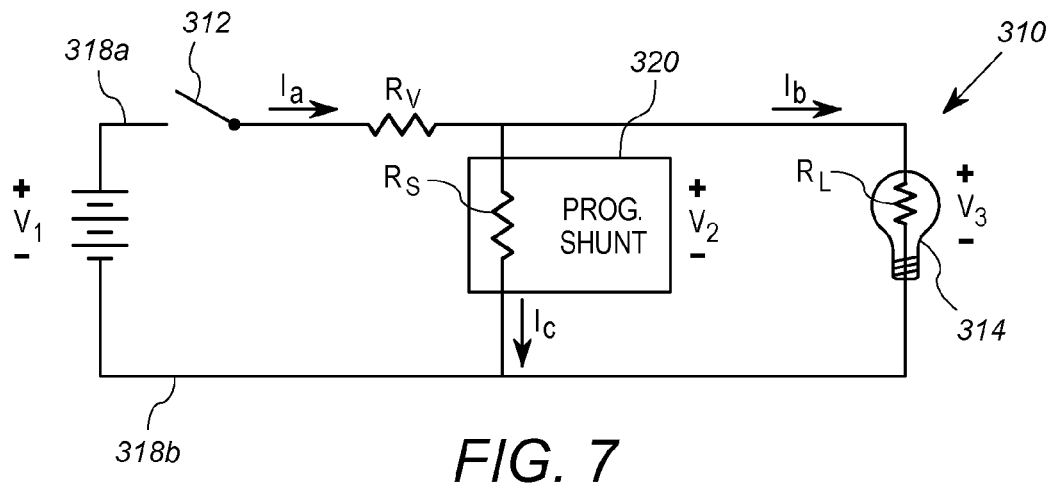
FIG. 7 is a high level schematic of a vehicle brake light circuit with a dual lead embodiment of the adaptive shunt device positioned in parallel with a stop lamp.

With reference to FIG. 7, a brake light wiring circuit 310 includes a brake switch 312, a stop lamp 314, a battery 316, and a programmable shunt device 320. The brake light wiring circuit 310 is configured such that the stop lamp 314 illuminates when a brake pedal of a vehicle (not shown) is depressed. The stop lamp 314 may be provided by an LED or incandescent light that illuminates when a voltage is applied to the device and current flows through the stop lamp 314. As described herein, illumination of the stop lamp 314 includes an initial period of pulsation/flashing followed by a period of constant illumination of the stop lamp 314.

With continued reference to FIG. 7, the brake switch 312 is configured to close upon application of the brakes of a vehicle (not shown). The switch 312 may be provided in any of various forms as will be recognized by those of ordinary skill in the art. For example, the switch 312 may be a relay that closes in association with mechanical depression of the brake pedal. When the brake switch 312 is closed, the circuit 310 is completed, and various circuit elements, including stop lamp 314 and programmable shunt device 320 are connected to the vehicle battery 316.

The programmable shunt device 320 is provided in the circuit 310 in parallel with the stop lamp 314. In particular, the leads of the programmable shunt device 320 and the stop lamp 314 are connected in parallel across the positive line 18a and the return line 318b from the battery 316 in the circuit 310. A voltage source applies an equal voltage to two components arranged in parallel in an electrical circuit. Thus, in the arrangement of FIG. 1, the same voltage (from the battery 316) is applied across both the programmable shunt device 320 and the stop lamp 314 when the brake switch 312 is closed (i.e., $V_2=V_3$).

Although an equal voltage is applied across the programmable shunt device 320 and the stop lamp 314 when the brake switch 312 is closed, the current flowing through the two components will vary depending on the resistance and other electrical properties of each component. In particular, the current flowing through each component will vary depending on the resistance, reluctance, temperature and other electrical properties provided by the components and the associated electrical wiring. The resistance across the programmable shunt device 320 is variable based on the resistance provided by the programmable shunt device. As the current through the programmable shunt device is varied, the current (and power) through the stop lamp 314 is also varied. To this end, the programmable shunt device 320 is configured to vary the resistance and other electrical properties in order to control the flashing/pulsating of the stop lamp 314. The flashing/pulsating is generally provided by a reduction in the current $i_b$ flowing through the stop lamp 314 when the programmable shunt 320 has a lower resistance and a relatively high amount of current, and by increased current $i_b$ flowing through the stop lamp 314 when the programmable shunt 320 has a higher resistance and draws a relatively low amount of current. By quickly varying the resistance of the programmable shunt device 320, the current through the stop lamp 314 may result in the stop lamp cycling from 40% to 100% power, resulting in a pulsing/flashing effect.

The circuit 310 of FIG. 7 with the programmable shunt device 320 may be considered "smart" because it is programmable for various modes of operation involving various amounts of pulses, frequency, period, times, etc. The programmable shunt device 320 is may be configured such that it is programmable with the use of two or three clipable wire jumpers that result in various modes of operation. In addition, the programmable shunt device may include a programmable microprocessor and associated memory that stores an executable program.

Figure 8:
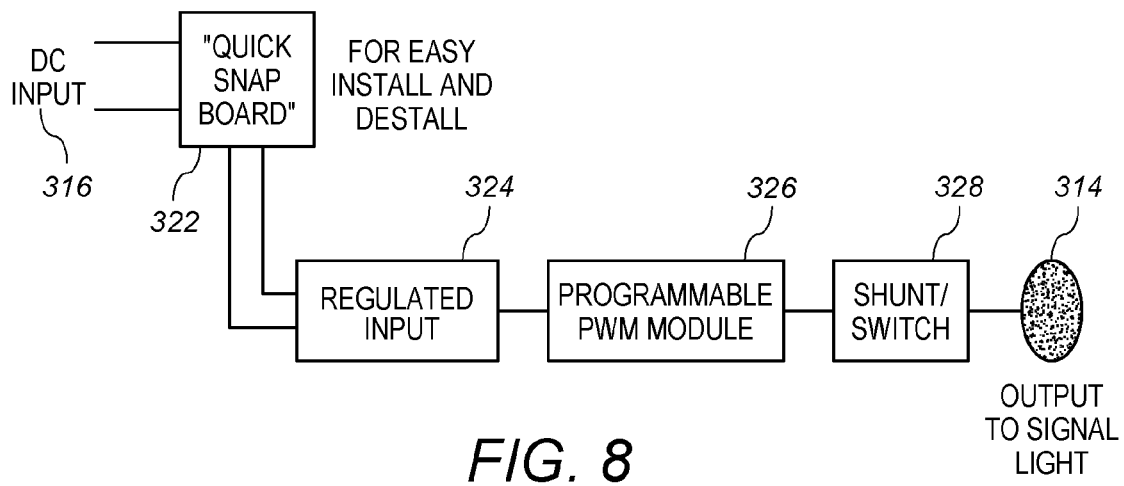
FIG. 8 shows a block diagram of various components incorporated in the adaptive shunt device of FIG. 7.

FIG. 8 shows a block diagram of various components incorporated in the programmable shunt of FIG. 7. As shown in FIG. 8, the programmable shunt is mounted on a "quick snap board" 322 that is configured to clip to existing vehicle brake light wiring for easy installation and removal. The "quick snap board" may be provided in any of several forms such as an insulation displacement connector (IDC) printed circuit board. The device 320 includes several components mounted on the board 322, including a voltage regulator 324, programmable PWM (pulse width modulation) module 326, and a shunt/switch 328. These components 324, 326 and 328 may all be provided on a single microprocessor. The device may further include an A/D converter. The voltage regulator 324 provides a regulated voltage input based on the battery 316, which generally allows for operation in the range of 8-17 VDC. The programmable PWM module 326 allows for any of various programmable outputs or multiple mode operation, including delay, hold back time, frequency control, number of pulses, and full control. The shunt/switch 328 controls the overall resistance of the device 320 based on inputs from the PWM module 326. The shunt/switch may be configured to compensate for any fluctuations in order to try and prevent the system from operating in an improper manner.

In at least one exemplary embodiment, the voltage $V_1$ across the battery shown in FIG. 7 is 12V, which provides a voltage $V_3$ across the stop lamp of less than 12V (considering line losses and any other vehicle load $r_v$ in series with the brake light circuit). In at least one embodiment, the 12V battery results in approximately 912 ma of current flowing through the branch of the circuit of FIG. 7 containing the stop lamp 314 (i.e., $i_b$=912 ma). To achieve this current through the stop lamp 314, the resistance of the programmable shunt device 320 is initially relatively high, such that almost no current flows through the branch of the circuit containing the programmable shunt device 320 (i.e., $i_c$ is about zero). Then, the programmable shunt device 320 is adjusted such that the resistance provided by the programmable shunt device 320 is much less. This results in approximately 536 ma of current flowing through the programmable shunt device 320 and approximately 376 ma of current flowing through the branch of the circuit that contains the stop lamp 314. In both cases (i.e., when the resistance of the programmable shunt device is high and low), the total current flowing through the circuit is about 912 ma (i.e., $i_a=i_b+i_c$=912 ma).

Figure 9:
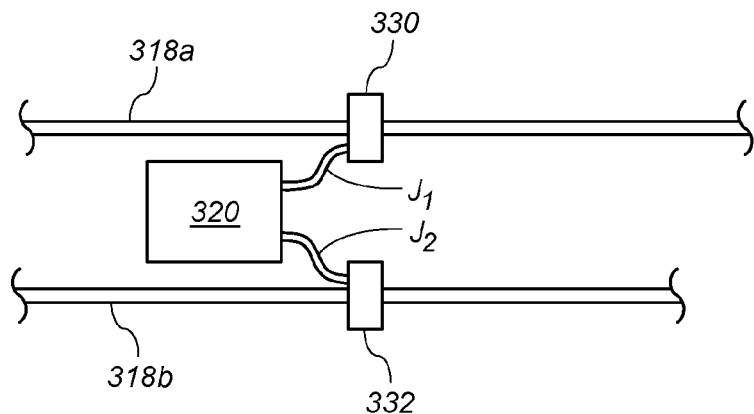
FIG. 9 shows a block diagram of the programmable shunt device in association with a brake detection line and a return line of the vehicle brake light circuit of FIG. 7.

As shown in FIG. 9, the programmable shunt device 320 may be easily incorporated onto existing vehicle wiring to form the circuit of FIG. 1. In particular, in order to install the programmable shunt device 320 in a vehicle, the user simply identifies the wires on the wire harness that lead to the stop lamp 314 (i.e., the brake detection line 318a and the return line 318b). The user then clamps the positive lead wire $J_1$ on to the brake detection line 318a using a first IDC connector 330 and on to the negative lead wire $J_2$ on to the return line 318b using a second IDC connector 32. Accordingly, in this embodiment, the user can easily install the programmable shunt device 320 without the need for cutting any existing wires in the vehicle. This process is not only easy but also saves significant installation time. The process may be performed by various individuals who wish to add the features associated with the programmable shunt device 320 to their vehicle, including vehicle owners as well as automobile dealers.

In an exemplary simplified version of the embodiment of FIG. 7, the programmable shunt device 320 acts as a variable resistor having a shunt resistance $r_s$, as noted in FIG. 7. The shunt resistance $r_s$ is varied over time to effect pulsation of the brake light 314. As shown in FIG. 7, the resistance of the stop lamp 314 has a resistance $r_L$. The line losses and other vehicle loads on the brake detection line are provided by $r_v$. Consider the battery to have a voltage of approximately 14V DC ($V_1$=14V), $r_v$=5 ohms, and $r_L$=100 ohms. In an exemplary high illumination (i.e., high brightness) situation for the lamp 314 (i.e. high power output), $r_s$=100 ohms, thus forcing a relatively high amount of current through the brake lamp 314. In this exemplary high illumination time period, $r_s$=$r_L$, $V_2$=$V_3$, and therefore $i_2$=$i_3$. Based on these exemplary values provided above, $i_3$=0.127 A. Accordingly, the power output from the lamp during this high brightness time period is $P=i_3^2 *(r_L)=(0.127)^2*100=1.61$ W.

Now, consider the same circuit in an exemplary low illumination time period for the lamp 314 (i.e. low power output). In this embodiment, the shunt branch effectively shorts a significant amount of current from the brake light. Accordingly, in this low illumination situation consider $r_s$ to be relatively low, such as $r_s$=10 ohms. Consider all the other units (other than $r_s$) in the schematic of FIG. 7 to be the same as those described above. In this low illumination example, $10r_s$=$r_L$, and $V_2$=$V_3$, and therefore $i_2$=$10i_3$. Based on these exemplary values, $i_3$=0.09 A. Accordingly, the power output from the lamp in this low brightness situation is $P=i_3^2*(r_L)=(0.09)^2*100=0.81$ W.

In view of the above example, it is shown that a shunt branch with a variable resistance provided in parallel with the vehicle brake lamp may be selectively operated to effect either a high brightness or a low brightness. If the resistance $r_s$ in the shunt branch is cycled between two values, the brake lamp 314 will also cycle between a high brightness and a low brightness, thus effecting a pulsing effect in the brake light. With additional circuitry, the shunt device 320 shown in FIG. 7 may be configured to effect a pulsing of the brake light 314 when a voltage is detected on the brake detection line 318a in a vehicle braking circuit 310.

The foregoing detailed description of one or more exemplary embodiments of the adaptive shunt light for a pulsing brake light has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A device configured for installation in an existing vehicle brake light circuit having at least one brake light, a first line connected to a first side of the at least one brake light, and a severed second line connected to a second side of the at least one brake light, the device comprising:
a first lead, a second lead and a third lead, the first lead configured for connection to the first line of the vehicle brake light circuit, the second lead and the third lead configured for connection to the severed second line of the vehicle brake light circuit, the first lead and the second lead defining a device output, the device output configured for connection in parallel with the at least one brake light;
a control unit; and
a switching member provided in a shunt path connected in parallel with the device output and controlled by the control unit, the switching member configured to operate in a first state or a second state, wherein the control unit is configured to control the switching member such that (i) a current through the shunt path is reduced when the switching member operates in the first state and thus a current through the at least one brake light is increased when the switching member operates in the first state, and (ii) the current through the shunt path is increased when the switching member operates in the second state and thus the current through the at least one brake light is reduced when the switching member operates in the second state.

2. The device of claim 1 wherein the first line is a brake detection line and the second line is a return line.

3. The device of claim 1 wherein the first line is a return line and the second line is a brake detection line.

4. The device of claim 1 wherein the switching member is a first switching member connected in series between the first lead and the second lead, the device further comprising a second switching member connected in series between the second lead and the third lead.

5. The device of claim 4 wherein the first switching member is a first transistor and the second switching member is a second transistor.

6. The device of claim 5 further comprising a current sensor configured to detect a magnitude of current on the second line during an initial time period following application of a vehicle brake, the control unit and the second switching member further configured to maintain the magnitude of current on the second line during a second time period following the initial time period.

7. The device of claim 6 wherein the current is substantially blocked from flowing through the shunt path when the first switching member operates in the first state, and wherein current is substantially un-blocked from flowing through the shunt path when the first switching member operates in the second state.

8. The device of claim 6 wherein the current sensor is a second current sensor, the device further comprising a first current sensor configured to detect a magnitude of current through the shunt path.

9. The device of claim 1 wherein the control unit is configured to control the switching member to operate in the first state for a first time period following application of a braking voltage to the first line or the second line, and to operate in the second state for a second time period following the first time period.

10. A brake light control unit connected to a vehicle brake light circuit, the vehicle brake light circuit including at least one brake light, a first line connected to a first side of the at least one brake light, and a severed second line connected to a second side of the at least one brake light, the brake light control unit comprising:
a first lead, a second lead, and a third lead;

a first switching member connected between the first lead and the second lead and in parallel with the at least one brake light, the first switching member provided in a shunt path extending between the first line and the severed second line of the vehicle brake light circuit;

a second switching member connected between the second lead and the third lead and in series with the at least one brake light; and a control unit coupled to the first switching member and the second switching member, the control unit configured to (i) detect a braking voltage on one of the first line or the second line of the vehicle brake light circuit, (ii) control the second switching member such that a current through the second switching member is substantially constant when the braking voltage is detected, and (iii) control the first switching member such that a current through the at least one brake light cycles between a first magnitude and a second magnitude that is less than the first magnitude after the braking voltage is detected.

11. The brake light control unit of claim 10 wherein the control unit is separate from the shunt path, wherein a current through the shunt path is reduced when the current through the at least one brake light is the first magnitude, and wherein the current through the shunt path is increased when the current through the at least one brake light is the second magnitude.

12. The brake light control unit of claim 10 the shunt path further including at least one resistor, and wherein the first switching member is a first transistor and the second switching member is a second transistor.

13. The brake light control unit of claim 10 wherein a current through the shunt path is less when the current through the at least one brake light is the first magnitude, and the current through the shunt path is greater when the current through the at least one brake light is the second magnitude.

14. The brake light control unit of claim 10 wherein the current through the at least one brake light cycles between the first magnitude and the second magnitude for a predetermined time period after the braking voltage is detected on the first line.

15. The brake light control unit of claim 10 wherein the first line is a brake detection line and the second line is a return line.

16. The brake light control unit of claim 10 wherein the first line is a return line and the second line is a brake detection line.

17. A method of controlling illumination of at least one brake light in a brake light circuit of a vehicle, the brake light circuit including the at least one brake light and brake light wiring, the brake light wiring including a first line connected to a first side of the at least one brake light and a second line connected to a second side of the at least one brake light, the method comprising:

severing the second line connecting a shunt path in parallel with the brake light between the first line and the severed second line, the shunt path including a switching member; and installing a control unit connected to the switching member, the control unit configured to control the switching member in a first state and a second state such that (i) a current through the shunt path is reduced when the switching member operates in the first state and thus a current through the at least one brake light is increased when the switching member operates in the first state, and (ii) the current through the shunt path is increased when the switching member operates in the second state and thus the current through the at least one brake light is reduced when the switching member operates in the second state.

18. The method of claim 17 wherein the switching member is a first switching member and the severed second line includes a first severed end and a second severed end, the method further comprising:

installing a second switching member between the first severed end and the second severed end of the severed second line, the control unit further configured to control the second switching member such that a current through the second switching member is substantially constant when a braking voltage is detected on the first line or the second line.

* * * * *